US 6,599,855 B2

(12) United States Patent
Naito

(10) Patent No.: US 6,599,855 B2
(45) Date of Patent: Jul. 29, 2003

(54) NONREDUCING DIELECTRIC CERAMIC AND CERAMIC ELECTRONIC COMPONENT USING SAME

(75) Inventor: Masahiro Naito, Shiga-ken (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 35 days.

(21) Appl. No.: 10/033,855

(22) Filed: Jan. 3, 2002

(65) Prior Publication Data

US 2002/0132127 A1 Sep. 19, 2002

(30) Foreign Application Priority Data

Jan. 10, 2001 (JP) ........................................ 2001-002261

(51) Int. Cl.$^7$ ............................................. C04B 35/468
(52) U.S. Cl. ....................... 501/139; 501/138; 333/167; 333/185
(58) Field of Search ................................ 501/136, 137, 501/138, 135; 333/167, 185

(56) References Cited

U.S. PATENT DOCUMENTS 5,994,253 A * 11/1999 Sasaki et al. ................ 501/139

6,441,559 B1 * 8/2002 Yamamoto et al. ...... 315/169.1

FOREIGN PATENT DOCUMENTS

| JP | 55-20602 | 6/1980 |
| JP | 07-211137 | 8/1995 |
| JP | 2000-040636 | 2/2000 |
| WO | 02/06184 | * 1/2002 |

* cited by examiner

*Primary Examiner*—Karl Group
(74) *Attorney, Agent, or Firm*—Dickstein, Shapiro, Morin & Oshinsky LLP.

(57) ABSTRACT

A nonreducing dielectric ceramic contains a tungsten-bronze-type crystal phase including at least Ba, RE and Ti as elements, and a pyrochlore-type crystal phase including at least RE and Ti as elements, where RE is at least one rare-earth element. The relationship $0.10 \leq b/(a+b) \leq 0.90$ is satisfied, where a is the maximum peak intensity assigned to the tungsten-bronze-type crystal phase and b is the maximum peak intensity assigned to the pyrochlore-type crystal phase determined by X-ray diffractometry. A ceramic electronic component includes an electronic component body composed of the nonreducing dielectric ceramic and a conductor in contact with the nonreducing dielectric ceramic.

13 Claims, 4 Drawing Sheets

NONREDUCING DIELECTRIC CERAMIC AND CERAMIC ELECTRONIC COMPONENT USING SAME

BACKGROUND OF THE INVENTION

1. Field of the Invention

The present invention relates to nonreducing dielectric ceramics and ceramic electronic components, such as monolithic ceramic capacitors and monolithic LC filters, using the nonreducing dielectric ceramics. More particularly, the invention relates to improvements in nonreducing dielectric ceramics so that cofiring with copper or copper alloys can be performed.

2. Description of the Related Art

Dielectric ceramics containing tungsten-bronze-type crystal phases, such as a $BaRE_2Ti_4O_{12}$-type crystal phase and a $BaRE_2Ti_5O_{14}$-type crystal phase, where RE is a rare-earth metallic element, which are used for ceramic electronic components such as temperature compensating type ceramic capacitors, are disclosed in Japanese Examined Patent Application Publication No. 55-20602, etc. Since the dielectric loss is small (the Q factor is high), they are suitable for use in the ceramic electronic components, and since the relative dielectric constant $\in$ is relatively high at 70 to 80, the ceramic electronic components can be miniaturized.

On the other hand, ceramic electronic components which are used in the high-frequency band such as monolithic LC filters, must have internal conductors built therein with high conductivity. Therefore, highly conductive materials, such as gold, silver and copper, must be used as the conductive materials for the internal conductors. It must also be taken into consideration that metals contained in the internal conductors built into monolithic ceramic electronic components can be cofired with dielectric ceramics. Moreover, metals used for the internal conductors are desirably relatively inexpensive.

Because gold or silver used as the conductive material are relatively expensive, the cost of the resultant ceramic electronic component is increased. Also, silver has a low melting point of approximately 960° C., and sintering of ceramics below this temperature often causes difficulties. Furthermore, conductors, such as internal electrodes, are formed in contact with a ceramic in monolithic ceramic electronic components, and the use of silver for the conductors may result in migration.

In contrast, since copper is relatively inexpensive, the cost of the resultant ceramic electronic component can be kept low. Since copper also has the highest melting point of approximately 1,080° C. and has a high conductivity, it is suitable as the material for conductors built into ceramic electronic components used in the high frequency band. However, when copper is used as the conductive material in the fabrication process, firing must be performed in a neutral or reducing atmosphere. Therefore, the dielectric ceramic used in the monolithic ceramic electronic component must have a nonreducing property in addition to the high relative dielectric constant, high Q factor and high temperature stability.

A $BaRE_2Ti_4O_{12}$-based or $BaRE_2Ti_5O_{14}$-based tungsten-bronze-type crystal phase requires a high firing temperature of 1,300 to 1,400° C. in order to perform sintering. It is therefore not possible to use copper as the material for a conductor which is cofired with these crystal phases.

Additionally, if the tungsten-bronze-type crystal phase is fired in a neutral or reducing atmosphere, it becomes semi-conductive because it has a poor nonreducing property, resulting in degradation in insulation resistance and dielectric loss.

Furthermore, since the tungsten-bronze-type crystal phase has a high rate of change in capacitance with temperature of approximately −100 ppm/° C., the applications of the ceramic electronic component containing this crystal phase is limited.

SUMMARY OF THE INVENTION

It is an object of the present invention to provide a nonreducing dielectric ceramic which can be cofired with a conductor composed of copper or a copper alloy as the conductive material, and in which the insulation resistance and the dielectric loss are not greatly degraded even if firing is performed in a neutral or reducing atmosphere, and the rate of change in capacitance with temperature is low, within ±60 ppm/° C. It is another object of the present invention to provide a ceramic electronic component using the nonreducing dielectric ceramic.

In one aspect of the present invention, a nonreducing dielectric ceramic contains a tungsten-bronze-type crystal phase including at least Ba, RE and Ti as elements, and a pyrochlore-type crystal phase including at least RE and Ti as elements, where RE is at least one rare-earth element and the relationship $0.10 \leq b/(a+b) \leq 0.90$ is satisfied, where a is the maximum peak intensity assigned to the tungsten-bronze-type crystal phase and b is the maximum peak intensity assigned to the pyrochlore-type crystal phase determined by X-ray diffractometry.

Preferably, the nonreducing dielectric ceramic of the present invention contains a principal constituent including the tungsten-bronze-type crystal phase and the pyrochlore-type crystal phase, and contains, as secondary constituents, about 3 to 35 moles of Mn relative to 100 moles of Ti in the principal constituent, about 3 to 25 parts by weight of a glass component containing $B_2O_3$ relative to 100 parts by weight of the principal constituent, 0 to about 25 moles of Cu relative to 100 moles of Ti in the principal constituent, and 0 to about 25 moles of V relative to 100 moles of Ti in the principal constituent.

Preferably, the tungsten-bronze-type crystal phase is at least one of a $BaNd_2Ti_4O_{12}$-type crystal phase and a $BaNd_2Ti_5O_{14}$-type crystal phase in the nonreducing dielectric ceramic of the present invention.

Preferably, the pyrochlore-type crystal phase is an $Nd_2Ti_2O_7$ type crystal phase.

The $BaNd_2Ti_4O_{12}$-type crystal phase, the $BaNd_2Ti_5O_{14}$-type crystal phase and the $Nd_2Ti_2O_7$-type crystal phase are not limited to $BaNd_2Ti_4O_{12}$, $BaNd_2Ti_5O_{14}$, and $Nd_2Ti_2O_7$, respectively, and, for example, Nd may be partially replaced with another rare-earth element.

In another aspect of the present invention, a ceramic electronic component includes an electronic component body including the nonreducing dielectric ceramic and a conductor in contact with the nonreducing dielectric ceramic. The electronic component body of the ceramic electronic component may have a multilayered structure in which a plurality of dielectric ceramic layers composed of the nonreducing dielectric ceramic are laminated or may have a so-called single-layer structure.

The nonreducing dielectric ceramic of the present invention can be cofired with copper or a copper alloy, and even if firing is performed in a neutral or reducing atmosphere, the insulation resistance and the dielectric loss are not greatly degraded, and it is possible to provide a low rate of change in capacitance with temperature within ±60 ppm/° C.

Consequently, when such a nonreducing dielectric ceramic is used for an electronic component body in a ceramic electronic component including a conductor in contact with the electronic component body, it is possible to produce a ceramic electronic component which is highly reliable with respect to electrical characteristics, such as insulation resistance and dielectric loss, and which has superior temperature stability.

Preferably, the ceramic electronic component is a monolithic ceramic capacitor including a plurality of dielectric ceramic layers composed of the nonreducing dielectric ceramic and at least one pair of internal electrodes disposed with some of the dielectric ceramic layers therebetween.

The ceramic electronic component of the present invention can be a monolithic LC filter including a plurality of dielectric ceramic layers composed of the nonreducing dielectric ceramic and internal electrodes forming inductance L and capacitance C among the dielectric ceramic layers.

If the nonreducing dielectric ceramic is used as the ceramic constituting the dielectric ceramic layers, reliability in the electric characteristics, such as insulation resistance and dielectric loss, can be enhanced, and the rate of change in capacitance with temperature can be decreased. Consequently, the nonreducing dielectric ceramic of the present invention can be advantageously used as dielectric materials for temperature compensating type ceramic capacitors, microwave dielectric resonators, multilayered circuit components, etc.

In such a ceramic electronic component of the present invention, preferably, the conductor or the internal electrode includes elemental copper or a copper alloy as a conductive material. Since copper or a copper alloy can be used as the conductive material contained in the conductor or the internal electrode in the ceramic electronic component, the cost of the ceramic electronic component can be kept low, and also superior high frequency characteristics can be attained.

DESCRIPTION OF THE PREFERRED EMBODIMENTS

Figure 1:
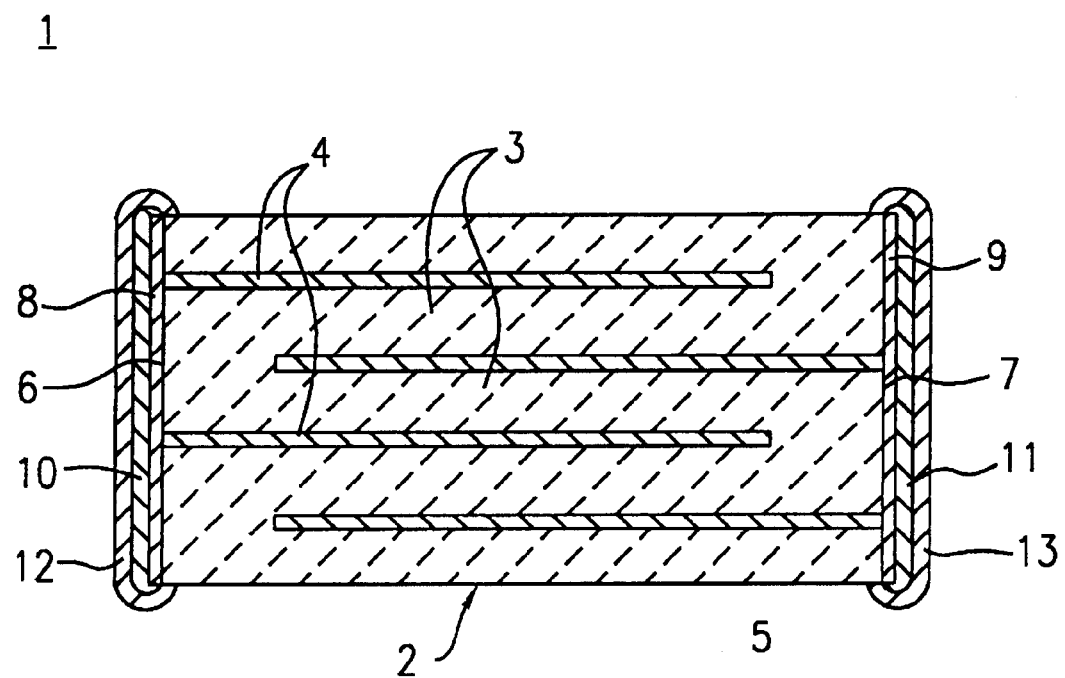
FIG. 1 is a sectional view of a monolithic ceramic capacitor in an embodiment of the present invention.

FIG. 1 is a sectional view which schematically shows a ceramic electronic component in an embodiment of the present invention, more specifically, a monolithic ceramic capacitor 1.

The monolithic ceramic capacitor 1 includes a laminate 2. The laminate 2 includes a plurality of dielectric ceramic layers 3 and a plurality of internal electrodes 4 and 5 which are formed along a plurality of predetermined interfaces between the dielectric ceramic layers 3. The internal electrodes 4 and 5 extend to the outer surfaces of the laminate 2. More specifically, the internal electrodes 4 which extend to a side 6 of the laminate 2 and the internal electrodes 5 which extend to another side 7 are alternately arranged in the laminate 2.

External electrodes 8 and 9 are formed on sides 6 and 7, respectively. The external electrode 8 is electrically connected to the internal electrodes 4 and the external electrode 9 is electrically connected to the internal electrodes 5.

First plating layers 10 and 11 composed of nickel, copper or the like, are formed on the external electrodes 8 and 9, respectively, and second plating layers 12 and 13 composed of solder, tin or the like, are further formed thereon. The formation of conductive layers, such as the plating layers 10 to 13, may be omitted depending on the intended application of the monolithic ceramic capacitor 1.

In the monolithic ceramic capacitor 1, the dielectric ceramic layers 3 are composed of a nonreducing dielectric ceramic of the present invention. The nonreducing dielectric ceramic contains a tungsten-bronze-type crystal phase including at least Ba, RE and Ti as elements, and a pyrochlore-type crystal phase including at least RE and Ti as elements.

With respect to the tungsten-bronze-type crystal phase including at least Ba, RE and Ti as elements, such as the $BaRE_2Ti_4O_{12}$-based or the $BaRE_2Ti_5O_{14}$-based tungsten-bronze-type crystal phase, the firing temperature is high, the nonreducing property is poor and the rate of change in capacitance with temperature is high at approximately −100 ppm/° C.

On the other hand, the pyrochlore-type crystal phase including at least RE and Ti as elements, such as a $RE_2Ti_2O_7$-based pyrochlore-type crystal phase, has a superior nonreducing property and the rate of change in capacitance with temperature is positive at approximately 150 ppm/° C.

Therefore, by incorporating a certain amount of the pyrochlore-type crystal phase with the tungsten-bronze-type crystal phase, a nonreducing dielectric ceramic is obtained in which the nonreducing property is superior and the rate of change in capacitance with temperature is low.

If the amount of the pyrochlore-type crystal phase too large, the relative dielectric constant $\in$ may be decreased, and the rate of change in capacitance with temperature may be increased positively. Therefore, it is considered that the content of the pyrochlore-type crystal phase in the nonreducing dielectric ceramic must be in a preferable range. The present invention has been achieved by finding the preferable range based on the experiment described below.

That is, the content of the pyrochlore-type crystal phase in the nonreducing dielectric ceramic is selected so that the relationship $0.10 \leq b/(a+b) \leq 0.90$ is satisfied, where a is the maximum peak intensity assigned to the tungsten-bronze-type crystal phase and b is the maximum peak intensity assigned to the pyrochlore-type crystal phase determined by X-ray diffractometry.

In the nonreducing dielectric ceramic containing the tungsten-bronze-type crystal phase and the pyrochlore-type crystal phase, by setting the content of the pyrochlore-type crystal phase so as to satisfy the relationship described above, it is possible to obtain a nonreducing dielectric ceramic which has a relatively high relative dielectric constant $\in$, a superior nonreducing property and a low rate of change in capacitance with temperature.

The nonreducing dielectric ceramic may contain Mn, a glass component containing $B_2O_3$, Cu and V as secondary constituents, in addition to a principal constituent including the tungsten-bronze-type crystal phase and the pyrochlore-type crystal phase.

The content of Mn as the secondary constituent is set at about 3 to 35 moles relative to 100 moles of Ti in the principal constituent. The content of the glass component containing $B_2O_3$ is set at about 3 to 25 parts by weight relative to 100 parts by weight of the principal constituent. The Cu content is set at about 25 moles or less relative to 100 moles of Ti in the principal constituent. The V content is set at about 25 moles or less relative to 100 moles of Ti in the principal constituent.

When the monolithic ceramic capacitor 1 described above is of a temperature compensating type, the nonreducing dielectric ceramic of the present invention achieves a significant effect.

The nonreducing dielectric ceramic of the present invention can also be advantageously used for ceramic electronic components, e.g., multilayered circuit components, such as monolithic LC filters, used in the high-frequency band, microwave dielectric resonators and dielectric filters.

Figure 2:
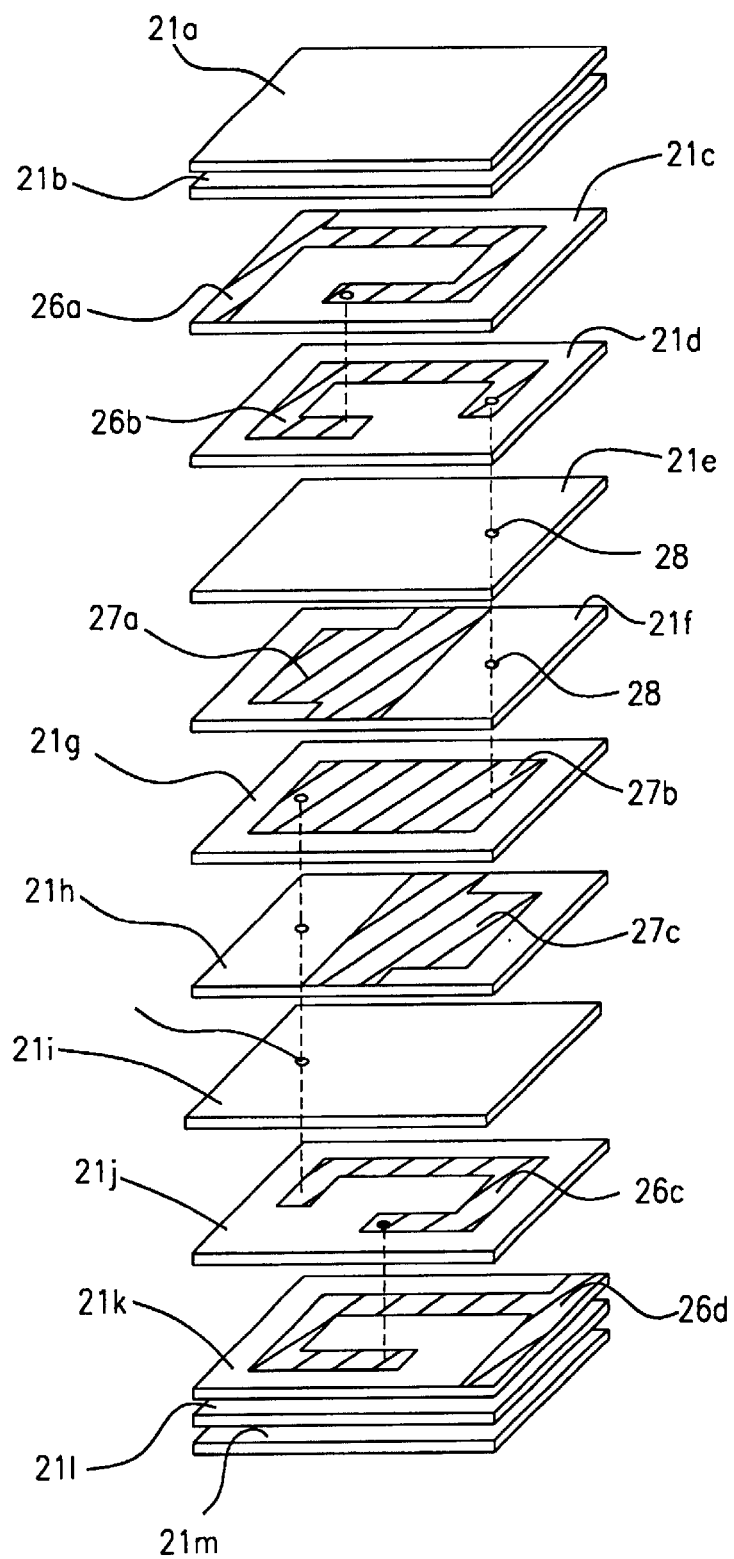
FIG. 2 is an assembly view of a monolithic LC filter in another embodiment of the present invention.
Figure 3:
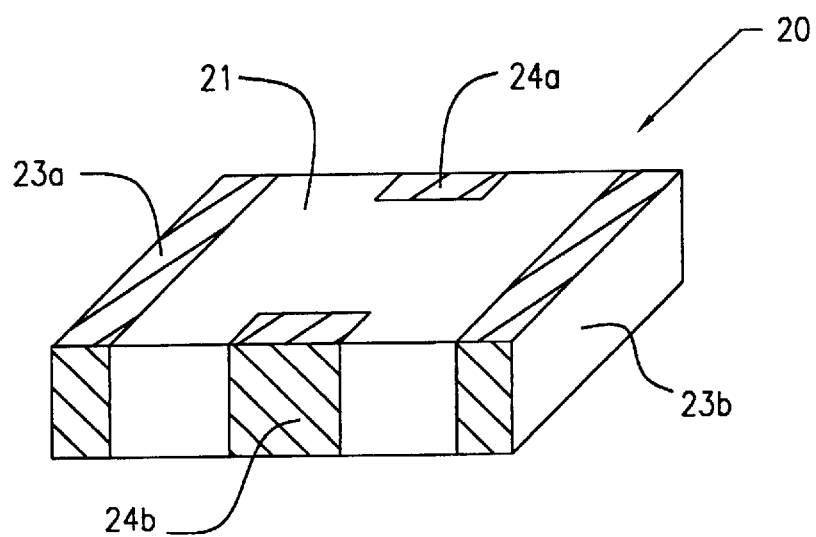
FIG. 3 is a perspective view which shows the appearance of the monolithic LC filter shown in FIG. 2.
Figure 4:
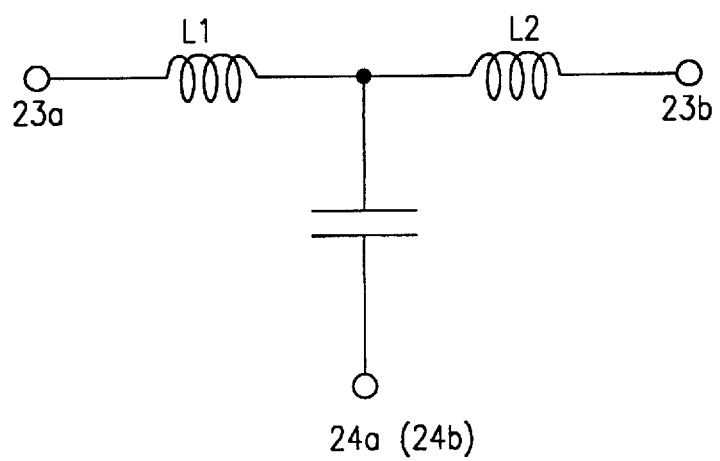
FIG. 4 is a circuit diagram of the monolithic LC filter shown in FIG. 2.

FIGS. 2 to 4 show a ceramic electronic component in another embodiment of the present invention, more specifically, a monolithic LC filter 20. The monolithic LC filter 20 includes a ceramic sintered compact 21 in which a circuit having inductance L and capacitance C, which will be described below, is formed. The ceramic sintered compact 21 is composed of the nonreducing dielectric ceramic of the present invention. External electrodes 23a, 23b, 24a and 24b are formed on the outer surfaces of the ceramic sintered compact 21, and an LC resonant circuit shown in FIG. 4 is arranged inside the external electrodes 23a, 23b, 24a and 24b.

A method for producing the ceramic sintered compact 21 will be described with reference to FIG. 2, from which the structure of the ceramic sintered compact 21 will also be obvious.

First, an organic vehicle is added to starting materials, which will be described below, to produce a ceramic slurry. The ceramic slurry is formed into ceramic green sheets by an appropriate sheet forming technique. The ceramic green sheets are dried and die-cut to a predetermined size, and thereby rectangular ceramic green sheets 21a to 21m are prepared.

Through-holes for forming a via-hole electrode 28 are made in the ceramic green sheets 21a to 21m as necessary. Furthermore, by screen-printing a conductive paste, coil conductors 26a and 26b, capacitor internal electrodes 27a to 27c, and coil conductors 26c and 26d are formed, and a conductive paste is filled in the via-hole electrode 28.

The ceramic green sheets 21a to 21m are then laminated as shown in FIG. 2, and a pressure is applied in the thickness direction to obtain a laminate. The resultant laminate is fired to obtain the ceramic sintered compact 21.

As shown in FIG. 3, the external electrodes 23a, 23b, 24a, and 24b are formed on the ceramic sintered compact 21 by a thin-film forming technique, such as application and baking of a conductive paste, vapor deposition, plating or sputtering. The monolithic LC filter 20 is thereby obtained.

As is obvious from FIG. 2, the coil conductors 26a and 26b constitute an inductance unit L1 shown in FIG. 4, the coil conductors 26c and 26d constitute an inductance unit L2, and the internal electrodes 27a to 27c constitute a capacitor.

In the monolithic LC filter 20 in this embodiment, the ceramic sintered compact 21, which is composed of the nonreducing dielectric ceramic of the present invention, can be obtained by low-temperature firing, and therefore, using a low-melting point metal, such as copper or a copper alloy, for the internal electrodes such as the coil conductors 26a to 26d and the capacitor internal electrodes 27a to 27c, cofiring can be performed with the ceramic in a neutral or reducing atmosphere. In addition, it is possible to construct a monolithic LC filter which has a high relative dielectric constant and a high Q factor at high frequencies, and is thus suitable for the high-frequency applications. Moreover, since the rate of change in capacitance with temperature of the nonreducing dielectric ceramic is low, it is possible to provide a monolithic LC filter having superior temperature characteristics.

EXAMPLE 1

An experiment was carried out to determine the ratio between the tungsten-bronze-type crystal phase and the pyrochlore-type crystal phase contained in nonreducing dielectric ceramics.

First, as starting materials, powders of $TiO_2$ and $RE_2O_3$ were prepared. The rare-earth elements used are shown in Table 1 below. Predetermined amounts of the above starting powders were weighed and wet-mixed using a ball mill, followed by drying. Calcination was then performed in air at 900 to 1,000° C. for 2 hours, and powders having $RE_2Ti_2O_7$ crystal phases were obtained.

In addition to the powders having $RE_2Ti_2O_7$ crystal phases, $BaCO_3$, $TiO_2$, $MnCO_3$, CuO, and $V_2O_5$ powders were prepared. These powders were weighed so as to satisfy the compositions shown in Table 1, and wet mixing was performed using a ball mill, followed by drying. Calcination was then performed in air at 900 to 1,100° C. for 2 hours, and calcined powders were obtained.

Glass powders with a composition of $10Li_2O$—$20SiO_2$—$20B_2O_3$—50BaO (% by weight) were prepared. The glass powders were added to 100 parts by weight of $aBaCO_3$—$bTiO_2$—$cRE_2Ti_2O_7$ as the principal constituent so as to satisfy the compositions shown in Table 1. Next, a polyvinyl butyral-based binder and an organic solvent, such as ethanol, were added thereto, followed by wet mixing using a ball mill, to obtain ceramic slurries.

The ceramic slurries were formed into sheets by a doctor blade process, and ceramic green sheets having a thickness of approximately 20 μm were obtained. For each sample, a plurality of ceramic green sheets were laminated, followed by pressing, to produce a green laminate with a thickness of approximately 0.6 mm.

A conductive paste containing copper as a conductive material was applied to the upper and lower surfaces of the green laminate, and then the green laminate was cut so as to have a 10 mm square planar shape.

The cut green laminate was heated at 350° C. in a nitrogen atmosphere to remove the binder, and then firing was performed in a reducing atmosphere comprising gases of $H_2$, $N_2$ and $H_2O$ at the temperature shown in Table 1 to obtain a ceramic sintered compact.

TABLE 1

| Sample No. | Firing Temperature °C. | Principal Constituent aBaCO$_3$—bTiO$_2$—cRE$_2$Ti$_2$O$_7$ | | | | Secondary Constituent Composition | | | |
|---|---|---|---|---|---|---|---|---|---|
| | | a mole % | b mole % | RE | c mole % | MnCO$_3$ moles per 100 moles Ti | CuO moles per 100 moles Ti | VO$_{5/2}$ moles per 100 moles Ti | Glass Component parts by weight |
| 1 | 1,010 | 25.00 | 50.00 | Nd | 25.00 | 7.0 | 2.0 | 0.5 | 10.0 |
| 2 | 1,010 | 24.68 | 49.35 | Nd | 25.97 | 7.0 | 2.0 | 0.5 | 10.0 |
| 3 | 1,000 | 0.00 | 0.00 | Nd | 100.0 | 7.0 | 2.0 | 0.5 | 10.0 |
| 4 | 980 | 7.69 | 15.38 | Nd | 76.93 | 7.0 | 2.0 | 0.5 | 10.0 |
| 5 | 1,000 | 14.28 | 42.86 | La | 42.86 | 7.0 | 2.0 | 0.5 | 10.0 |
| 6 | 1,000 | 14.28 | 42.86 | Nd/La = 0.5/0.5 | 42.86 | 7.0 | 2.0 | 0.5 | 10.0 |
| 7 | 1,000 | 14.28 | 42.86 | Sm | 42.86 | 7.0 | 2.0 | 0.5 | 10.0 |
| 8 | 1,000 | 14.28 | 42.86 | Nd/Sm = 0.5/0.5 | 42.86 | 7.0 | 2.0 | 0.5 | 10.0 |
| 9 | 1,000 | 3.94 | 34.65 | Nd | 61.41 | 7.0 | 2.0 | 0.5 | 10.0 |
| 10 | 1,000 | 22.22 | 33.33 | Nd | 44.45 | 7.0 | 2.0 | 0.5 | 10.0 |
| 11 | 990 | 24.02 | 48.05 | Nd | 27.93 | 7.0 | 2.0 | 0.5 | 10.0 |
| 12 | 1,000 | 12.5 | 37.50 | Nd | 50.00 | 7.0 | 2.0 | 0.5 | 10.0 |
| 13 | 1,000 | 21.55 | 43.11 | Nd | 35.34 | 7.0 | 2.0 | 0.5 | 10.0 |
| 14 | 1,000 | 7.46 | 35.82 | Nd | 56.72 | 7.0 | 2.0 | 0.5 | 10.0 |
| 15 | 990 | 13.25 | 26.51 | Nd | 60.24 | 7.0 | 2.0 | 0.5 | 10.0 |
| 16 | 990 | 12.50 | 25.00 | Nd | 62.50 | 7.0 | 2.0 | 0.5 | 10.0 |
| 17 | 1,000 | 3.78 | 41.23 | Nd | 54.99 | 7.0 | 2.0 | 0.5 | 10.0 |
| 18 | 1,020 | 8.82 | 17.65 | Nd | 73.53 | 7.0 | 2.0 | 0.5 | 10.0 |
| 19 | 1,000 | 14.28 | 42.86 | Nd | 42.86 | 7.0 | 2.0 | 0.5 | 10.0 |
| 20 | 1,000 | 9.44 | 45.28 | Nd | 45.28 | 7.0 | 2.0 | 0.5 | 10.0 |
| 21 | 1,000 | 18.18 | 36.37 | Nd | 45.45 | 7.0 | 2.0 | 0.5 | 10.0 |

The electrical characteristics of the ceramic sintered compact in each sample shown in Table 1, were evaluated.

More specifically, the capacitance and the Q factor were measured at a frequency of 1 MHZ and at 25° C., and the relative dielectric constant ∈ was calculated based on the capacitance.

The insulation resistance was measured by applying a DC voltage of 250 V for 2 minutes at 25° C., and the resistivity was calculated.

The capacitance was measured both at 25° C. and at 125° C. at a frequency of 1 MHZ, and the rate of change therebetween (TCC) (ppm/° C.) was calculated based on the equation below.

$$TCC = \{(C_{125} - C_{25})/C_{25}\} \times \{1/(125-25)\} \times 10^6$$

In the above equation, $C_{125}$ is the capacitance (pF) at 125° C., and $C_{25}$ is the capacitance (pF) at 25° C.

The ceramic sintered compact in each sample was pulverized in a mortar, and powder X-ray diffractometry was performed using CuK αrays (tube voltage: 40 kV; tube current 30 mA). The expression b/(a+b) was calculated, where a is the maximum peak intensity assigned to the tungsten-bronze-type crystal phase, and b is the maximum peak intensity assigned to the pyrochlore-type crystal phase. The X-ray diffractometry was performed under the conditions illustrated below.

Scanning mode: continuous
Scanning rate: 4°/minute
Scanning step: 0.02°
Scanning range: 20 to 60°
Divergent slit: 0.5°
Scattering slit: 0.5°
Light receiving slit: 0.15 mm The ceramics produced in this example contained a BaNd$_2$Ti$_4$O$_{12}$-type crystal the tungsten-bronze-type crystal phase and an Nd$_2$Ti$_2$O$_7$-type crystal phase as the pyrochlore-type crystal phase.

When the tungsten-bronze-type crystal phase is the BaNd$_2$Ti$_4$O$_{12}$-type crystal phase, the diffraction peak at the (511) face has the maximum peak intensity in X-ray diffraction. When the tungsten-bronze-type crystal phase is a BaNd$_2$Ti$_5$O$_{14}$-type crystal phase, the diffraction peak at the (151) face has the maximum peak intensity in X-ray diffraction.

When the pyrochlore-type crystal phase is the Nd$_2$Ti$_2$O$_7$ type crystal phase, the combined peak of the diffractions at the (112) face and at the (−212) face has the maximum peak intensity in X-ray diffraction.

Figure 5:
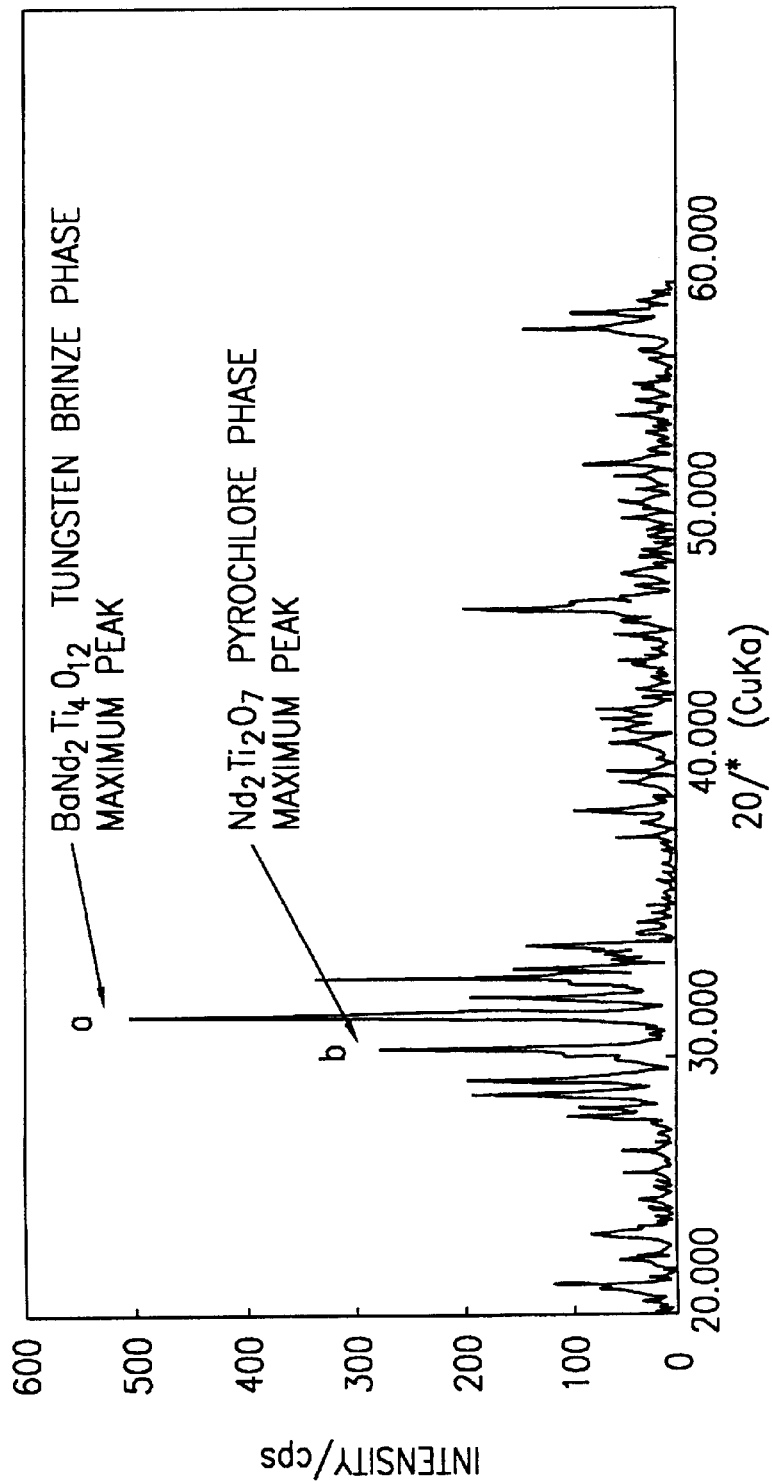
FIG. 5 is a graph showing an X-ray diffraction pattern of a ceramic with respect to Sample No. 19 in Example 1.

Table 2 below shows the peak intensity ratio b/(a+b), the relative dielectric constant ∈, the resistivity log ρ(Ω·m), and the rate of change in capacitance with temperature TCC (ppm/° C.) with respect to the individual samples shown in Table 1. FIG. 5 shows an X-ray diffraction pattern of Sample No. 19 representatively.

TABLE 2

| Sample No. | Peak Intensity ratio b/(a + b) | Relative Dielectric Constant ∈ | Resistivity log ρ (Ω · m) | Rate of Change in Capacitance with Temperature TCC (ppm/° C.) |
|---|---|---|---|---|
| 1 | 0.04 | 62 | 8.1 | −83 |
| 2 | 0.09 | 58 | 8.7 | −75 |
| 3 | 1.00 | 35 | 11.7 | 137 |
| 4 | 0.91 | 37 | 11.2 | 93 |
| 5 | 0.23 | 57 | 9.7 | −20 |
| 6 | 0.28 | 54 | 9.6 | −12 |
| 7 | 0.25 | 49 | 9.1 | −2 |
| 8 | 0.30 | 51 | 9.3 | −5 |
| 9 | 0.71 | 42 | 11.6 | 58 |
| 10 | 0.24 | 51 | 9.1 | −26 |
| 11 | 0.14 | 52 | 9.7 | −45 |
| 12 | 0.35 | 47 | 10.5 | −3 |

TABLE 2-continued

| Sample No. | Peak Intensity ratio b/(a + b) | Relative Dielectric Constant ε | Resistivity log ρ (Ω · m) | Rate of Change in Capacitance with Temperature TCC (ppm/° C.) |
|---|---|---|---|---|
| 13 | 0.39 | 49 | 11.2 | 2 |
| 14 | 0.56 | 47 | 11.3 | 22 |
| 15 | 0.78 | 43 | 11.1 | 56 |
| 16 | 0.80 | 42 | 11.6 | 58 |
| 17 | 0.50 | 46 | 11.1 | 7 |
| 18 | 0.88 | 41 | 10.8 | 60 |

TABLE 2-continued

| Sample No. | Peak Intensity ratio b/(a + b) | Relative Dielectric Constant ε | Resistivity log ρ (Ω · m) | Rate of Change in Capacitance with Temperature TCC (ppm/° C.) |
|---|---|---|---|---|
| 19 | 0.33 | 52 | 9.5 | −5 |
| 20 | 0.44 | 50 | 10.9 | −7 |
| 21 | 0.60 | 51 | 10.2 | 35 |

As shown in Tables 1 and 2, it was possible to perform firing of the nonreducing dielectric ceramics of Sample Nos. 5 to 21 in the reducing atmosphere at the temperature range of 980 to 1,020° C., and the resistivity was high at $1.0 \times 10^9$ Ω·m or more. Although not shown in Table 2, the Q factor at 1 MHZ was also high at 1,000 or more. The rate of change in capacitance with temperature was low within ±60 ppm/° C. Furthermore, since the individual characteristics have substantially linear relationships with the peak intensity ratio, it is possible to presume the individual characteristics based on the peak intensity ratio.

In contrast, when the peak intensity ratio was less than about 0.10 as is the case of Sample Nos. 1 and 2, the resistivity after firing in the reducing atmosphere was low, and the rate of change in capacitance with temperature was high at approximately −80 ppm/° C. since the content of the pyrochlore-type crystal phase was too low.

When the peak intensity ratio was more than about 0.90 as is the case of Sample Nos. 3 and 4, the relative dielectric constant ε was low, and the rate of change in capacitance with temperature was high at approximately 90 to 140 ppm/° C. since the content of the pyrochlore-type crystal phase was too high.

EXAMPLE 2

In Example 2, samples were produced in order to check the influence of the contents of Mn, the glass component, Cu, and V as the secondary constituents.

Ceramic sintered compacts were produced in the same manner as that in Example 1, apart from the fact that the individual starting materials were prepared so as to satisfy the compositions shown in Table 3.

TABLE 3

| | | Principal Constituent | | | | Secondary Constituent Composition | | | |
|---|---|---|---|---|---|---|---|---|---|
| | Firing | $aBaCO_3$—$bTiO_2$—$cRE_2Ti_2O_7$ | | | | $MnCO_3$ | CuO | $VO_{5/2}$ | Glass |
| Sample No. | Temperature ° C. | a mole % | b mole % | c RE | mole % | per 100 100 moles Ti | per 100 100 moles Ti | per 100 100 moles Ti | component parts by weight |
| 19 | 1,000 | 14.28 | 42.86 | Nd | 42.86 | 7.0 moles | 2.0 moles | 0.5 mole | 10.0 |
| 22 | 1,020 | 14.28 | 42.86 | Nd | 42.86 | 3.0 moles | 2.0 moles | 0.5 mole | 10.0 |
| 23 | 990 | 14.28 | 42.86 | Nd | 42.86 | 25.0 moles | 2.0 moles | 0.5 mole | 10.0 |
| 24 | 980 | 14.28 | 42.86 | Nd | 42.86 | 35.0 moles | 2.0 moles | 0.5 mole | 10.0 |
| 25 | 1,020 | 14.28 | 42.86 | Nd | 42.86 | 7.0 moles | 2.0 moles | 0.5 mole | 3.0 |
| 26 | 990 | 14.28 | 42.86 | Nd | 42.86 | 7.0 moles | 2.0 moles | 0.5 mole | 15.0 |
| 27 | 980 | 14.28 | 42.86 | Nd | 42.86 | 7.0 moles | 2.0 moles | 0.5 mole | 25.0 |
| 28 | 1,020 | 14.28 | 42.86 | Nd | 42.86 | 7.0 moles | 0.0 mole | 0.5 mole | 10.0 |
| 29 | 980 | 14.28 | 42.86 | Nd | 42.86 | 7.0 moles | 15.0 moles | 0.5 mole | 10.0 |
| 30 | 980 | 14.28 | 42.86 | Nd | 42.86 | 7.0 moles | 25.0 moles | 0.5 mole | 10.0 |
| 31 | 1,000 | 14.28 | 42.86 | Nd | 42.86 | 7.0 moles | 2.0 moles | 0.0 mole | 10.0 |
| 32 | 980 | 14.28 | 42.86 | Nd | 42.86 | 7.0 moles | 2.0 moles | 15.0 mole | 10.0 |
| 33 | 980 | 14.28 | 42.86 | Nd | 42.86 | 7.0 moles | 2.0 moles | 25.0 mole | 10.0 |

Table 3 also shows Sample No. 19 produced in Example 1.

The characteristics of the ceramic sintered compacts of the individual samples shown in Table 3 were evaluated in the same manner as that in Example 1. The results thereof are shown in Table 4 below.

TABLE 4

| Sample No. | Peak Intensity ratio b/(a + b) | Relative Dielectric Constant ε | Resistivity log ρ (Ω · m) | Rate of Change in Capacitance with Temperature TCC (ppm/° C.) |
|---|---|---|---|---|
| 19 | 0.33 | 52 | 9.5 | −5 |
| 22 | 0.66 | 45 | 10.9 | 47 |
| 23 | 0.29 | 53 | 9.6 | −17 |
| 24 | 0.28 | 53 | 9.7 | −20 |
| 25 | 0.72 | 43 | 11.1 | 57 |
| 26 | 0.28 | 52 | 9.8 | −20 |
| 27 | 0.22 | 54 | 9.5 | −31 |
| 28 | 0.51 | 48 | 10.1 | 17 |
| 29 | 0.31 | 54 | 10.4 | 24 |
| 30 | 0.29 | 56 | 10.6 | 28 |
| 31 | 0.42 | 52 | 11.4 | 21 |
| 32 | 0.44 | 49 | 9.5 | 10 |
| 33 | 0.45 | 48 | 9.4 | 8 |

Tables 3 and 4 show that even if the secondary constituents were added to the principal constituent including the tungsten-bronze-type crystal phase and the pyrochlore-type crystal phase, i.e., $aBaCO_3$—$bTiO_2$—$cRE_2Ti_2O_7$, the secondary constituents being about 3 to 35 moles of $MnCO_3$ relative to 100 moles of Ti in the principal constituent, about 3 to 25 parts by weight of the glass component relative to 100 parts by weight of the principal constituent, 0 to about 25 moles of CuO relative to 100 moles of Ti in the principal constituent, and 0 to about 25 moles of $VO_{5/2}$ relative to 100 moles of Ti in the principal constituent, it was possible to perform firing in the reducing atmosphere in the temperature range of 980 to 1,020° C. The resistivity was high at $1.0 \times 10^9$ Ω·m, and although not shown in Table 4, the Q factor at 1 MHZ was high at 1,000 or more. The rate of change in capacitance with temperature was low within ±60 ppm/° C. Furthermore, since the individual characteristics have substantially linear relationships with the peak intensity ratio, it is possible to presume the individual characteristics based on the peak intensity ratio.

Although the present invention has been described in relation to particular embodiments thereof, many other variations and modifications and other uses will become apparent to those skilled in the art.

What is claimed is:

1. A nonreducing dielectric ceramic comprising:
    a tungsten-bronze crystal phase comprising at least Ba, RE and Ti; and
    a pyrochlore crystal phase comprising at least RE and Ti, wherein RE is at least one rare-earth element, and wherein $0.10 \leq b/(a+b) \leq 0.90$, where a is the maximum peak intensity assigned to the tungsten-bronze crystal phase and b is the maximum peak intensity assigned to the pyrochlore crystal phase determined by X-ray diffractometry.

2. The nonreducing dielectric ceramic according to claim 1, wherein the tungsten-bronze crystal phase and the pyrochlore crystal phase constitute a principal constituent, and the nonreducing dielectric ceramic further comprises, as secondary constituents:
    about 3 to 35 moles of Mn relative to 100 moles of Ti in the principal constituent;
    about 3 to 25 parts by weight of a glass containing $B_2O_3$ relative to 100 parts by weight of the principal constituent;
    0 to about 25 moles of Cu relative to 100 moles of Ti in the principal constituent; and
    0 to about 25 moles of V relative to 100 moles of Ti in the principal constituent.

3. The nonreducing dielectric ceramic according to claim 2, wherein the tungsten-bronze crystal phase is at least one of a $BaNd_2Ti_4O_{12}$ crystal phase and a $BaNd_2Ti_5O_{14}$ crystal phase.

4. The nonreducing dielectric ceramic according to claim 3, wherein the pyrochlore crystal phase is an $Nd_2Ti_2O_7$ crystal phase.

5. The nonreducing dielectric ceramic according to claim 2, wherein the pyrochlore crystal phase is an $Nd_2Ti_2O_7$ crystal phase.

6. The nonreducing dielectric ceramic according to claim 1, wherein the tungsten-bronze crystal phase is at least one of a $BaNd_2Ti_4O_{12}$ crystal phase and a $BaNd_2Ti_5O_{14}$ crystal phase.

7. The nonreducing dielectric ceramic according to claim 1, wherein the pyrochlore crystal phase is an $Nd_2Ti_2O_7$ crystal phase.

8. A ceramic electronic component comprising:
    an electronic component body comprising a nonreducing dielectric ceramic according to claim 1; and
    a conductor in contact with the nonreducing dielectric ceramic.

9. The ceramic electronic component according to claim 8, wherein the conductor comprises one of elemental copper and a copper alloy.

10. The ceramic electronic component according to claim 8 in the form of a monolithic ceramic capacitor comprising:
    a plurality of dielectric ceramic layers comprising said nonreducing dielectric ceramic; and
    at least one pair of conductors disposed as internal electrodes with at least one dielectric ceramic layer therebetween.

11. The monolithic ceramic capacitor according to claim 10, wherein the internal electrodes comprise one of elemental copper and a copper alloy.

12. The ceramic electronic component according to claim 8 in the form of a monolithic LC filter comprising:
    a plurality of dielectric ceramic layers comprising said nonreducing dielectric ceramic; and
    a plurality of conductors disposed as internal electrodes forming an inductance and a capacitance disposed within the dielectric ceramic layers.

13. The monolithic LC filter according to claim 12, wherein the internal electrodes comprise one of elemental copper and a copper alloy.

* * * * *